UNITED STATES PATENT OFFICE.

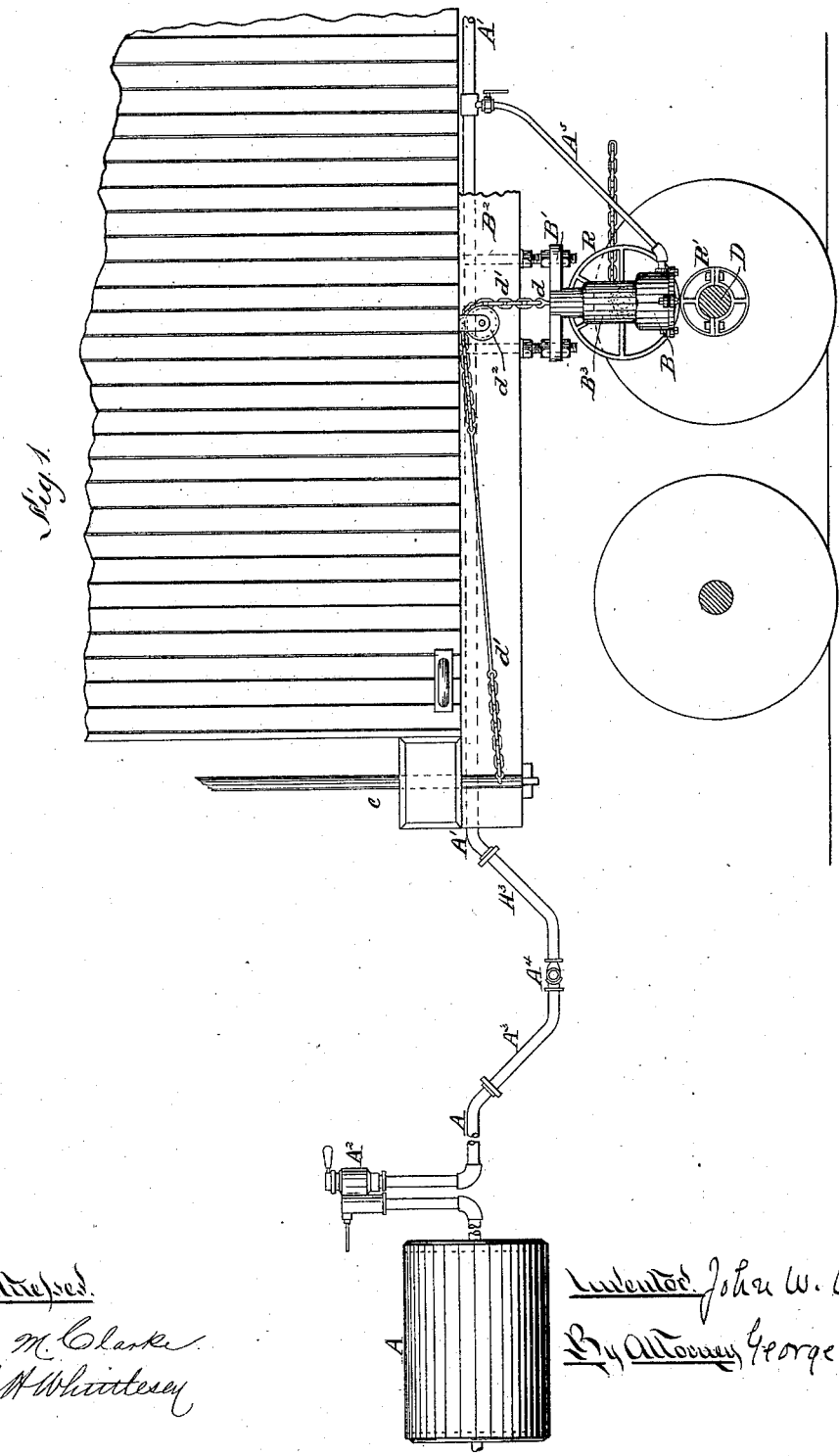

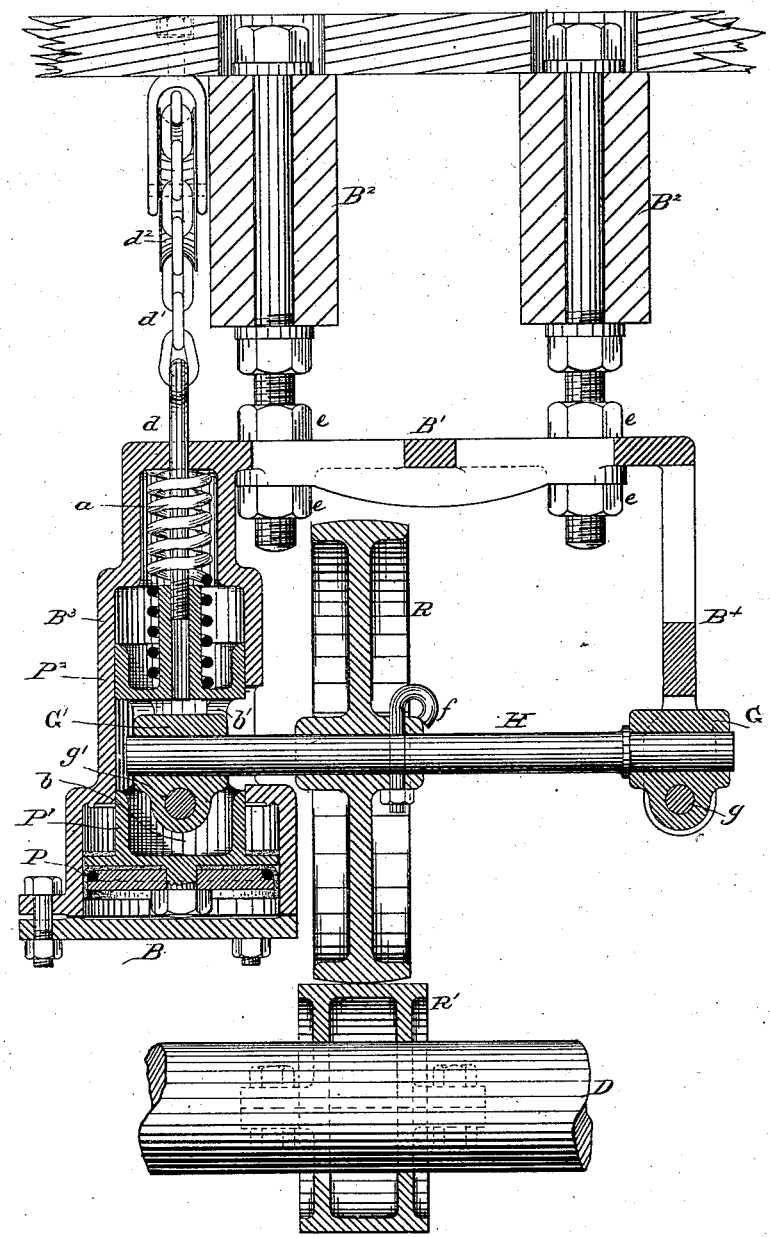

JOHN W. CLOUD, OF ALTOONA, PENNSYLVANIA.

RAILWAY-BRAKE APPARATUS.

SPECIFICATION forming part of Letters Patent No. 307,378, dated October 28, 1884.

Application filed June 2, 1883. (No model.)

*To all whom it may concern:*

Be it known that I, JOHN W. CLOUD, a citizen of the United States, residing at Altoona, county of Blair, State of Pennsylvania, have invented or discovered a new and useful Improvement in Railway-Brake Apparatus; and I do hereby declare the following to be a full, clear, concise, and exact description thereof, reference being had to the accompanying drawings, making a part of this specification, in which—like letters indicating like parts—

Figure 1, Sheet 1, illustrates the application of my present improvement to an ordinary freight-car; and Fig. 2, Sheet 2, is a vertical sectional view, to an enlarged scale, of that part of the apparatus which, as a part of the general system, contains the principal features of novelty.

The particular objects I have in view are substantially those stated in Patents No. 245,789, of August 16, 1881, and No. 269,012, of December 12, 1882, granted to me, and relate to an improved construction of apparatus for securing such objects—that is to say, the present apparatus is organized with reference to securing in a fluid-pressure train-brake system and by an automatic action different degrees or amounts of brake-power on the wheels of the different cars of the train, according to the varying loads on or carried by such wheels, so that the brakes will be applied with greatest effective power on the wheels of the heaviest-loaded cars, and with less power on the wheels of cars less heavily loaded, whereby the maximum of effective brake-power will, with comparative close approximation, be applied to all wheels of the train (so far as they are furnished with brakes) with a minimum of liability to slide any one wheel or pair of wheels.

In Fig. 1, A represents a fluid-pressure reservoir such as is commonly employed as a part of a railway power-brake apparatus, and which is usually arranged on the locomotive or tender. It is to be charged and kept charged, say, with compressed air at any desired degree of pressure, by any suitable means. The usual train or air pipe extends back through a charging or discharging cock, $A^2$, along under the several cars of the train; and between cars a connection is formed from car to car by means of flexible sections $A^3$ and couplings $A^4$, all of any known or suitable construction. From the continuous pipe $A'$ a branch, $A^5$, leads to the lower end of a brake-cylinder, B, which is made as a part of or is affixed to a strong frame, $B'$, and which frame is properly hung from the car or floor sills or timbers $B^2$. Each car is to be provided with one of these mechanisms, arranged immediately over an axle, D, of one truck; or one such may be provided for each truck. The cylinder B has a piston, P, packed as against fluid-pressure from beneath, and this piston is guided in its up-and-down motion by cylindrical guides $P'$ $P^2$, which are made on or form part of the piston-stem, and which play in a tubular extension or chamber, $B^3$, on the upper end of the cylinder B. Between these two guides $P'$ and $P^2$ the piston-stem is cored out, as at $b$, and transversely mortised, as at $b'$, so as to take in a bearing-block, $G'$, which is pivoted, as at $g$, to the stem or to side walls of the guide $P'$. The end of a brake-shaft, H, is inserted through the side mortise, $b'$, and into a hole bored for the purpose in the bearing-block G. Then as this end of the shaft H is raised or lowered, as presently to be described, and the shaft is consequently moved out of a horizontal position, its bearing-block $G'$, turning on the pivot $g'$, will prevent danger of binding at that point. The other end of the shaft H is hung in a stirrup, G, which is pivoted, as at $g$, in a fork made in the lower edge of the depending side $B^4$ of the frame $B'$. This is done in order that as the other end of the shaft H is raised or lowered, as presently to be described, the end in the bearing at G will not bind.

On the shaft H is a pulley-wheel, R, arranged immediately over and in the same plane with a pulley, $R'$, which latter is secured to the car-axle D, and the parts are so arranged that the two pulleys may be brought into or kept out of engagement with each other, as presently to be described. A suitable eyebolt, $f$, or other connection is to be added to the shaft H, for making connection with the usual brake-chain. Between the upper guide, $P^2$, and the top of the tubular extension $B^3$, I insert a comparatively stiff spiral spring, $a$, and from the upper end of the piston-stem I carry a rod, $d$, up through the top of the frame, and connect thereto a chain, $d'$, which passes over a sheave, $d^2$, and goes to the shaft $c$ of a hand-wheel at the end or other desired part of the car.

When the car is out of use or is not coupled up in a train having the other parts of a fluid-pressure-brake system, or when fluid-pressure is not available for use, the brakeman, by turning the shaft $c$, draws up the piston P and raises the end of the shaft H, so as to draw the pulley R out of engagement with the axle-pulley R', and by then locking the shaft by a pawl or dog the power-brake apparatus is kept out of operation. But when a car is coupled into a train having substantially the apparatus of Fig. 1, and air-pressure is turned on, then the shaft $c$ is loosened, and the fluid-pressure apparatus comes into operation, and is operated as follows: First, by the use of adjusting-nuts $e$ $e$, the frame B' and the appliances connected therewith are to be properly set, so that when the car receives its maximum load and the maximum fluid-pressure is let into the cylinder or cylinders B the piston will be forced up against the expressive force of the spring $a$ (with compression of the latter) sufficiently far, so that, raising the free end of the brake-shaft H, the brake-pulley R will be carried and held clear of contact with the axle-pulley R' during the running of the car, and the brakes will be off or out of action. Of course, with a light load or with an empty car, (the usual car-springs being thereby the less compressed,) the pulleys R R' will be at a greater distance apart. Then, when the engineer wishes to apply the brakes, he opens the cock $A^2$, so as to let some fluid-pressure escape from the train-pipe A', which has the effect to lessen the pressure in the cylinder or cylinders B, beneath the piston or pistons therein, and the spring $a$, then acting downward, depresses the piston P and its stem, and also the bearing at the free end of the shaft H, and consequently brings the brake-pulley R into engagement with the axle-pulley R', and the motion of the latter will be communicated to the former, so as to wind up on the brake-shaft H the brake-chain, the end of which is secured to the eye $f$, and the tightness or force with which the brakes will thus be applied will depend on the tightness of the frictional engagement between the pulley-wheels R and R', and this tightness will depend on the amount or degree of reduction of the fluid-pressure in the cylinder B and on the expansive or resilient action of the spring $a$, and this latter action depends on the amount of compression given to the spring $a$ in the original adjustment of the apparatus with relation to the load, as above stated. Also, as the pulley-wheels of heavily-loaded cars are normally nearer together than the pulley-wheels of less heavily-loaded cars, or than if the cars be empty, the frictional contact referred to will take place first on the more heavily-loaded cars, and as fluid-pressure is still further reduced the pulley-wheels R R' on the more lightly-loaded cars will come into operative engagement, and at the same time the tightness of contact between the pulley-wheels R R' on heavily-loaded cars will be increased; hence the braking-power actually applied on the several cars of a train will be proportional to the load of the cars, and the useful result following such apportionment will be obvious when it is remembered that the braking-power which can be applied without sliding the wheels varies approximately with the load; but in using the terms "load," "loaded," &c., I include the weight of the car itself, and the foregoing description is to be so understood.

In both the previous patents referred to, the fluid-pressure attachments were made on the truck-frame, which arrangement is open to some objections, partly on account of complication and partly on account of irregularities of motion under great strain in the different parts of the truck-frame. In the present apparatus both these objections are avoided. The fluid-pressure fixtures are attached to or connected with the car-body, so that irregularities resulting from strains are reduced to a minimum, and all the apparatus employed on the car or truck is readily accessible for renewal or repairs, and this feature of construction I believe to be new with myself. It may be variously modified or put into many forms; but the features which I consider essential are that the fluid-pressure cylinder (or equivalent diaphragm) shall be connected with the car-body as distinguished from the truck, and that by its motion one way or the other it shall put into or out of gear a frictional (or equivalant clutch) mechanism, one part of which shall take its motion from the car-axle and the other part of which shall be suitably connected with the brake-actuating mechanism, and within these limits the apparatus may be modified at pleasure without any substantial departure from the scope of the present invention.

I claim herein as my invention—

1. The combination of a fluid-pressure cylinder secured to a car-body above and perpendicular to a supporting-axle thereof, and a frictional mechanism, one part of which is arranged to take its motion from said axle, and the other part of which is moved vertically into or out of engagement therewith by a direct connection to the piston of said fluid-pressure cylinder, substantially as set forth.

2. In combination with an axle, pulley, a, R, brake-shaft H, pivoted bearing G G', and a fluid-pressure cylinder fixed upon a car-body and having its piston arranged to operate on one of said bearings, substantially as set forth.

3. In combination with an axle, a pulley, R', a frame, B', secured to the car-body, a brake-shaft, H, mounted in said frame, a pulley, R, on said shaft, a pivoted bearing, G, hung in one end or side of the frame, for supporting one end of the shaft, a pivoted vertically-movable bearing, G', for supporting the other end of the shaft, and a fluid-pressure cylinder and piston for operating such movable bearing.

4. In combination with the brake-shaft H and its pivoted bearings, the piston P, having a cylindrical guide-stem, brake-cylinder B, stem $d$, chain $d'$, sheave $d^3$, and a coiling-shaft, $c$, substantially as and for the purposes set forth.

In testimony whereof I have hereunto set my hand.

JOHN W. CLOUD.

Witnesses:
R. H. WHITTLESEY,
C. M. CLARKE.